US012012857B2

(12) United States Patent

DiBenedetto et al.

(10) Patent No.: US 12,012,857 B2
(45) Date of Patent: Jun. 18, 2024

(54) PLATFORM FOR AN AIRFOIL OF A GAS TURBINE ENGINE

(71) Applicant: RTX Corporation, Farmington, CT (US)

(72) Inventors: Enzo DiBenedetto, Berlin, CT (US); Jackson David Johnson, Mishawaka, IN (US); Nicholas J. Lawliss, West Hartford, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 17/966,297

(22) Filed: Oct. 14, 2022

(65) Prior Publication Data

US 2024/0125242 A1 Apr. 18, 2024

(51) Int. Cl.
*F01D 11/00* (2006.01)
*F01D 5/30* (2006.01)
*F01D 5/32* (2006.01)

(52) U.S. Cl.
CPC .......... *F01D 11/008* (2013.01); *F01D 5/3007* (2013.01); *F01D 5/326* (2013.01); *F05D 2220/32* (2013.01); *F05D 2220/36* (2013.01); *F05D 2240/80* (2013.01); *F05D 2260/36* (2013.01)

(58) Field of Classification Search
CPC .... F01D 11/008; F01D 5/3007; F01D 5/3015; F01D 5/326; F05D 2220/36; F05D 2240/80
See application file for complete search history.

(56) References Cited

U.S. PATENT DOCUMENTS 2,873,088 A 2/1959 Neumann
4,655,687 A 4/1987 Atkinson
5,049,035 A * 9/1991 Marlin .................. F01D 11/008 416/193 A
5,193,982 A 3/1993 Inizan et al.
(Continued)

FOREIGN PATENT DOCUMENTS

EP 0311514 B1 3/1991
EP 1013886 B1 10/2005
(Continued)

OTHER PUBLICATIONS

European Extended Search Report for European Application No. 23203874.5; Date of Action: Feb. 16, 2024; 8 pages.

*Primary Examiner* — Topaz L. Elliott
(74) *Attorney, Agent, or Firm* — CANTOR COLBURN LLP

(57) ABSTRACT

Fan assemblies for gas turbine engines include a rotor disk having a plurality of lugs with a plurality of slots defined between adjacent lugs. A fan platform is configured to be mounted to a lug of the plurality of lugs, the fan platform having a forward tab and an aft tab. An aft retention ring is configured to be fixedly attached to an aft side of the rotor disk and has a platform retention hook for receiving the aft tab of the fan platform. A forward retention ring is configured to be fixedly attached to a forward side of the rotor disk, the forward retention ring having a tab hook configured to attach the forward retention ring to the lug of the plurality of lugs and retain the forward tab of the fan platform to the lug of the plurality of lugs.

20 Claims, 12 Drawing Sheets

(56) References Cited

U.S. PATENT DOCUMENTS

| | | | | |
|---|---|---|---|---|
| 5,263,823 | A * | 11/1993 | Cabaret | F01D 11/006 416/220 R |
| 5,277,548 | A * | 1/1994 | Klein | F01D 11/008 416/193 A |
| 5,281,096 | A * | 1/1994 | Harris | F01D 11/008 416/193 A |
| 6,739,837 | B2 * | 5/2004 | Barnette | F01D 5/3007 416/248 |
| 6,942,462 | B2 | 9/2005 | Breakwell et al. | |
| 7,284,958 | B2 | 10/2007 | Dundas et al. | |
| 7,527,476 | B2 | 5/2009 | Butt et al. | |
| 8,425,192 | B2 | 4/2013 | Hoyland et al. | |
| 8,851,850 | B2 | 10/2014 | Hoyland et al. | |
| 9,267,386 | B2 | 2/2016 | Turner et al. | |
| 9,366,183 | B2 | 6/2016 | Patsouris et al. | |
| 9,540,935 | B2 * | 1/2017 | Perdrigeon | F01D 5/3015 |
| 9,752,449 | B2 | 9/2017 | Bottome et al. | |
| 9,759,129 | B2 | 9/2017 | Lindsey et al. | |
| 10,018,048 | B2 | 7/2018 | Alarcon et al. | |
| 10,024,177 | B2 | 7/2018 | Brown | |
| 10,119,423 | B2 | 11/2018 | Kling et al. | |
| 10,253,640 | B2 | 4/2019 | Mortier et al. | |
| 10,344,601 | B2 | 7/2019 | Turner et al. | |
| 10,487,736 | B2 | 11/2019 | Servant | |
| 10,746,031 | B2 * | 8/2020 | Heeter | F01D 11/008 |
| 11,021,974 | B2 * | 6/2021 | Freeman | F01D 5/3015 |
| 11,174,741 | B2 | 11/2021 | Karkos et al. | |
| 2003/0194321 | A1 * | 10/2003 | Barnette | F01D 5/3092 416/248 |
| 2004/0258528 | A1 | 12/2004 | Goga et al. | |
| 2009/0022593 | A1 * | 1/2009 | Oka | F01D 5/323 416/220 R |
| 2010/0329873 | A1 * | 12/2010 | Ruba | F01D 5/3015 29/889.21 |
| 2013/0315744 | A1 | 11/2013 | Perdrigeon et al. | |
| 2016/0376920 | A1 * | 12/2016 | Luczak | F01D 5/26 416/1 |
| 2018/0105242 | A1 * | 4/2018 | Kray | F01D 11/008 |
| 2019/0323366 | A1 | 10/2019 | Karkos et al. | |
| 2020/0116034 | A1 * | 4/2020 | Freeman | F01D 5/3015 |
| 2021/0189893 | A1 | 6/2021 | De Gaillard et al. | |

FOREIGN PATENT DOCUMENTS

| | | | | |
|---|---|---|---|---|
| EP | 1016588 | B1 | 4/2006 | |
| EP | 2154334 | B1 | 7/2014 | |
| EP | 2090749 | B1 | 10/2015 | |
| EP | 2998515 | A1 * | 3/2016 | F01D 11/008 |
| EP | 1557538 | B1 | 8/2016 | |
| EP | 2837773 | B1 | 11/2016 | |
| EP | 2098689 | B1 | 12/2016 | |
| EP | 1865154 | B1 | 3/2017 | |
| EP | 2503102 | A3 | 8/2017 | |
| EP | 2951417 | B1 | 8/2017 | |
| EP | 2267277 | A3 | 11/2017 | |
| EP | 2463482 | A3 | 12/2017 | |
| EP | 2511479 | B1 | 1/2018 | |
| EP | 2837772 | B1 | 6/2018 | |
| EP | 2322765 | B1 | 8/2018 | |
| EP | 2594773 | B1 | 9/2019 | |
| EP | 3170984 | B1 | 4/2020 | |
| EP | 3536909 | B1 | 4/2021 | |
| FR | 2814495 | A1 * | 3/2002 | F01D 5/3015 |
| FR | 2972482 | A1 * | 9/2012 | F01D 11/008 |
| FR | 2988426 | A1 | 9/2013 | |
| FR | 3096729 | B1 | 5/2019 | |
| FR | 3089258 | B1 * | 11/2020 | |
| FR | 3073907 | B1 * | 12/2020 | F01D 11/008 |
| FR | 3108149 | A1 * | 9/2021 | F01D 11/008 |
| FR | 3108665 | A1 * | 10/2021 | |
| GB | 2006883 | A | 5/1979 | |
| RU | 87212 | U1 | 9/2009 | |

* cited by examiner

PLATFORM FOR AN AIRFOIL OF A GAS TURBINE ENGINE

BACKGROUND

The subject matter disclosed herein generally relates to airfoil platforms used in gas turbine engines and, more particularly, to airfoil platforms.

Gas turbine engines generally include a fan section, a compressor second, a combustor section, and turbine sections positioned along a centerline referred to as an "axis of rotation." The fan, compressor, and combustor sections add work to air (also referred to as "core gas") flowing through the engine. The turbine extracts work from the core gas flow to drive the fan and compressor sections. The fan, compressor, and turbine sections each include a series of stator and rotor assemblies. The stator assemblies, which do not rotate (but may have variable pitch vanes), increase the efficiency of the engine by guiding core gas flow into or out of the rotor assemblies.

The fan section includes a rotor assembly and a stator assembly. The rotor assembly of the fan includes a rotor disk and a plurality of outwardly extending rotor blades. Each rotor blade includes an airfoil portion, a dove-tailed root portion, and a platform. The airfoil portion extends through the flow path and interacts with the working medium gases to transfer energy between the rotor blade and working medium gases. The dove-tailed root portion engages attachment means of the rotor disk. In some configurations, the fan blade platform and the fan blade airfoil are a unitary body. In other embodiments, the platform may be positioned between adjacent airfoil portions and may be a separate component or structure that is separately or independently attached to the fan rotor disk. The stator assembly includes a fan case, which circumscribes the rotor assembly in close proximity to the tips of the rotor blades.

To reduce the size and cost of the rotor blades, or, if integration onto the rotor blades is not practical, the platform size may be reduced and a separate fan blade platform may be attached to the rotor disk. To accommodate the separate fan blade platforms, outwardly extending tabs or lugs may be integrated onto the rotor disk to enable attachment of the platforms. Improved rotor systems and/or platforms may be advantageous.

SUMMARY

According to some embodiments, fan assemblies for gas turbine engines are provided. The fan assemblies include a rotor disk having a plurality of lugs about an outer diameter of the rotor disk, wherein a plurality of slots are defined between adjacent lugs about the outer diameter of the rotor disk, a fan platform configured to be mounted to a lug of the plurality of lugs, the fan platform having a forward tab and an aft tab, an aft retention ring configured to be fixedly attached to an aft side of the rotor disk, the aft retention ring having a platform retention hook for receiving the aft tab of the fan platform, and a forward retention ring configured to be fixedly attached to a forward side of the rotor disk, the forward retention ring having a tab hook configured to attach the forward retention ring to the lug of the plurality of lugs and retain the forward tab of the fan platform to the lug of the plurality of lugs.

In addition to one or more of the features described above, or as an alternative, further embodiments of the fan assemblies may include that each lug of the plurality of lugs comprises a mounting structure on a forward side thereof, wherein the mounting structure is configured to receive a portion of the forward retention ring and a fastener to affix the forward retention ring to the respective lug.

In addition to one or more of the features described above, or as an alternative, further embodiments of the fan assemblies may include that each mounting structure comprises a tab recess configured to receive a respective forward tab of a fan platform.

In addition to one or more of the features described above, or as an alternative, further embodiments of the fan assemblies may include that each mounting structure and the forward retention ring having a bayonet-and-slot arrangement, wherein the forward retention ring is configured to rotate from a first position to a second position relative to the rotor disk, wherein in the second position the fastener may pass through each of the forward retention ring and the mounting structure to secure the forward retention ring to the rotor disk.

In addition to one or more of the features described above, or as an alternative, further embodiments of the fan assemblies may include that the fan platform has a gaspath surface and comprises at least one first support rib extending between a forward end and an aft end of the fan platform, wherein the first support rib is arranged opposite the gaspath surface.

In addition to one or more of the features described above, or as an alternative, further embodiments of the fan assemblies may include that the fan platform has a gaspath surface and comprises at least one second support rib extending transverse from the at least one first support rib.

In addition to one or more of the features described above, or as an alternative, further embodiments of the fan assemblies may include at least one fan blade installed within a slot of the plurality of slots.

In addition to one or more of the features described above, or as an alternative, further embodiments of the fan assemblies may include that the at least one fan blade is retained in an axial direction at an aft end by the aft retention ring and at a forward end by the forward retention ring.

In addition to one or more of the features described above, or as an alternative, further embodiments of the fan assemblies may include that the aft retention ring is attached to the rotor disk at one or more lug flanges at aft ends of one or more of the plurality of lugs.

In addition to one or more of the features described above, or as an alternative, further embodiments of the fan assemblies may include that the aft retention ring has a conical shaped portion extending from a portion that attaches to the rotor disk to the platform retention hook.

In addition to one or more of the features described above, or as an alternative, further embodiments of the fan assemblies may include that the forward retention ring and the rotor disk are formed from the same material.

In addition to one or more of the features described above, or as an alternative, further embodiments of the fan assemblies may include that the forward retention ring comprises a plurality of tab hooks and a plurality of blade retention portions arranged in an alternating pattern.

According to some embodiments, gas turbine engines are provided. The gas turbine engines include a fan assembly, a compressor section, a combustor section, and a turbine section arranged to define a core flow path through the gas turbine engine. The fan assembly includes a rotor disk having a plurality of lugs about an outer diameter of the rotor disk, wherein a plurality of slots are defined between adjacent lugs about the outer diameter of the rotor disk, a fan platform configured to be mounted to a lug of the plurality of lugs, the fan platform having a forward tab and an aft tab, an aft retention ring configured to be fixedly attached to an aft side of the rotor disk, the aft retention ring having a platform retention hook for receiving the aft tab of the fan platform, and a forward retention ring configured to be fixedly attached to a forward side of the rotor disk, the forward retention ring having a tab hook configured to attach the forward retention ring to the lug of the plurality of lugs and retain the forward tab of the fan platform to the lug of the plurality of lugs.

In addition to one or more of the features described above, or as an alternative, further embodiments of the gas turbine engines may include that each lug of the plurality of lugs comprises a mounting structure on a forward side thereof, wherein the mounting structure is configured to receive a portion of the forward retention ring and a fastener to affix the forward retention ring to the respective lug.

In addition to one or more of the features described above, or as an alternative, further embodiments of the gas turbine engines may include that the fan platform has a gaspath surface and comprises at least one first support rib extending between a forward end and an aft end of the fan platform, wherein the first support rib is arranged opposite the gaspath surface.

In addition to one or more of the features described above, or as an alternative, further embodiments of the gas turbine engines may include at least one fan blade installed within a slot of the plurality of slots.

In addition to one or more of the features described above, or as an alternative, further embodiments of the gas turbine engines may include that the aft retention ring is attached to the rotor disk at one or more lug flanges at aft ends of one or more of the plurality of lugs.

In addition to one or more of the features described above, or as an alternative, further embodiments of the gas turbine engines may include that the aft retention ring has a conical shaped portion extending from a portion that attaches to the rotor disk to the platform retention hook.

In addition to one or more of the features described above, or as an alternative, further embodiments of the gas turbine engines may include that the forward retention ring and the rotor disk are formed from the same material.

In addition to one or more of the features described above, or as an alternative, further embodiments of the gas turbine engines may include that the forward retention ring comprises a plurality of tab hooks and a plurality of blade retention portions arranged in an alternating pattern.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Detailed descriptions of one or more embodiments of the disclosed apparatus and/or methods are presented herein by way of exemplification and not limitation with reference to the Figures.

Figure 1:
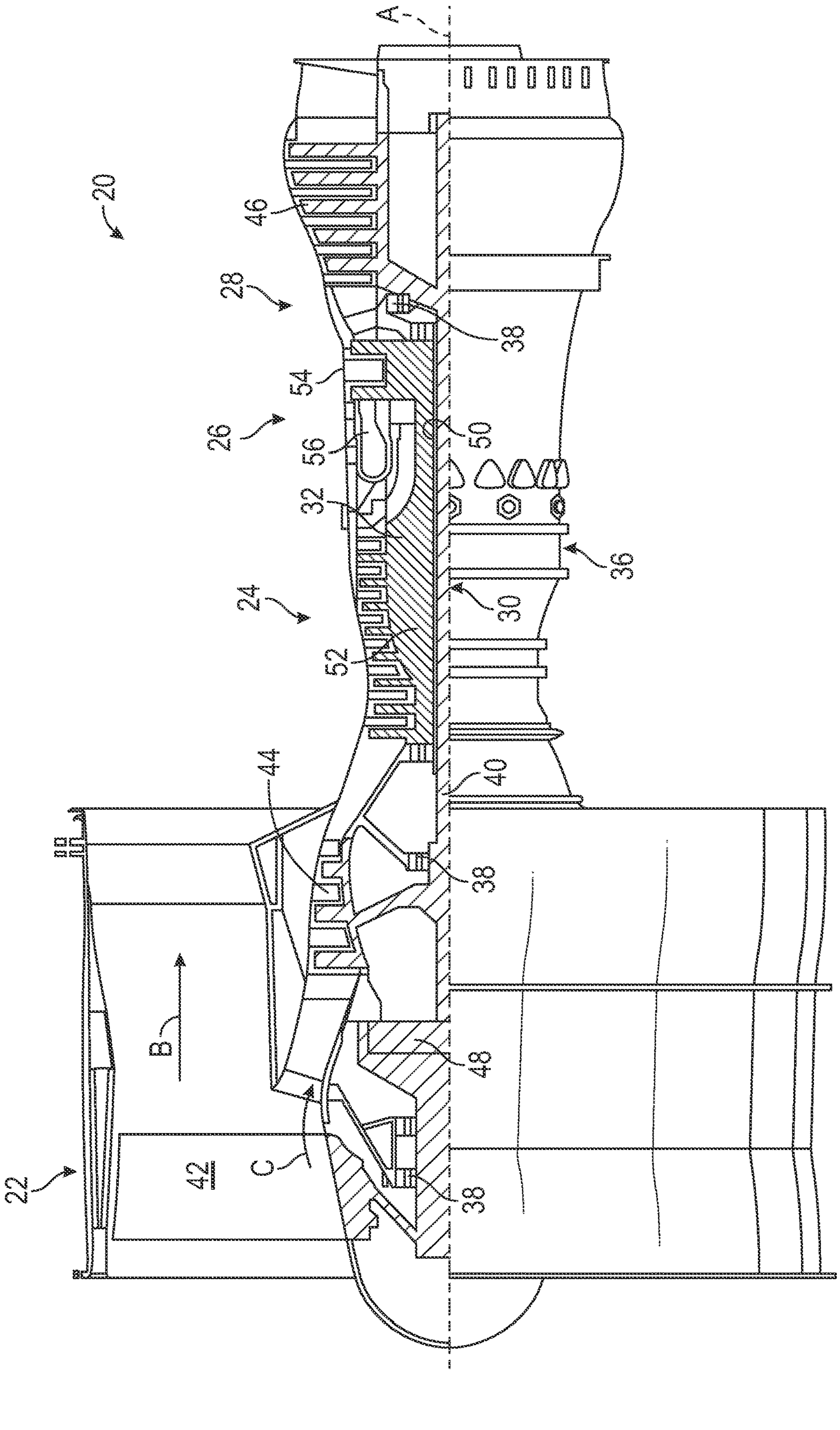
FIG. 1 is a schematic cross-sectional illustration of a gas turbine engine that may incorporate embodiments of the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 can be connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(514.7° \text{ R})]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets and turboshafts, wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2A:
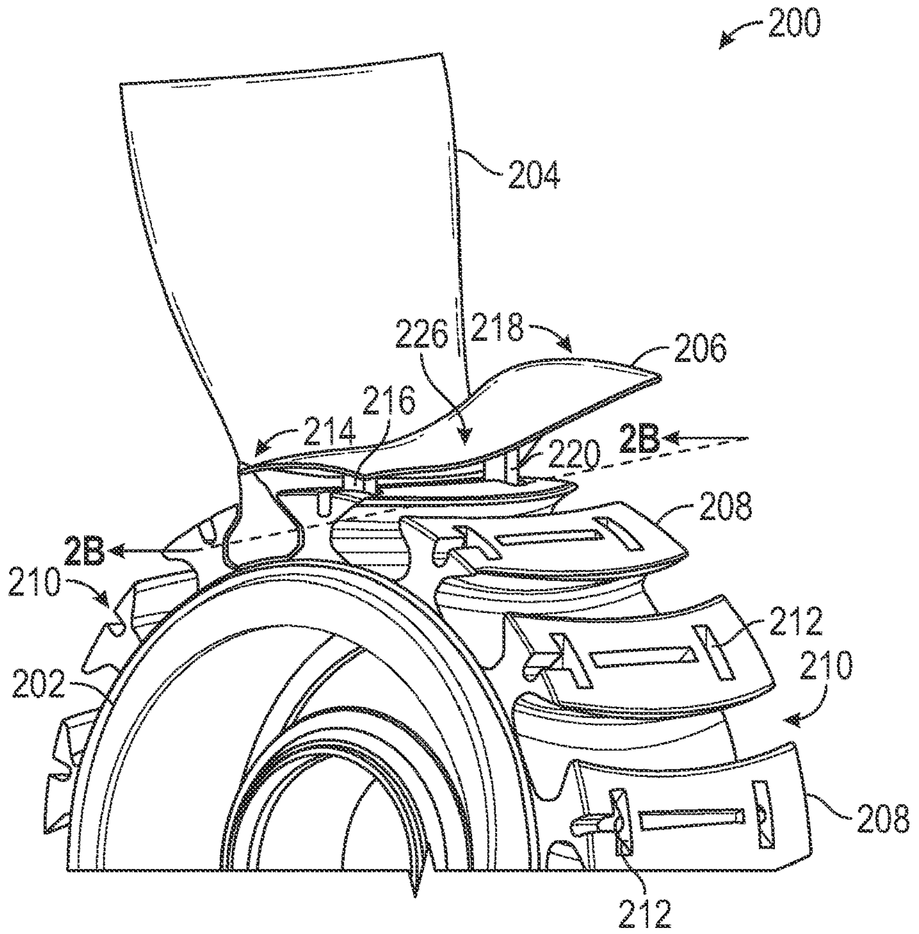
FIG. 2A (Prior Art)
FIG. 2A is a schematic illustration of a fan assembly.
Figure 2B:
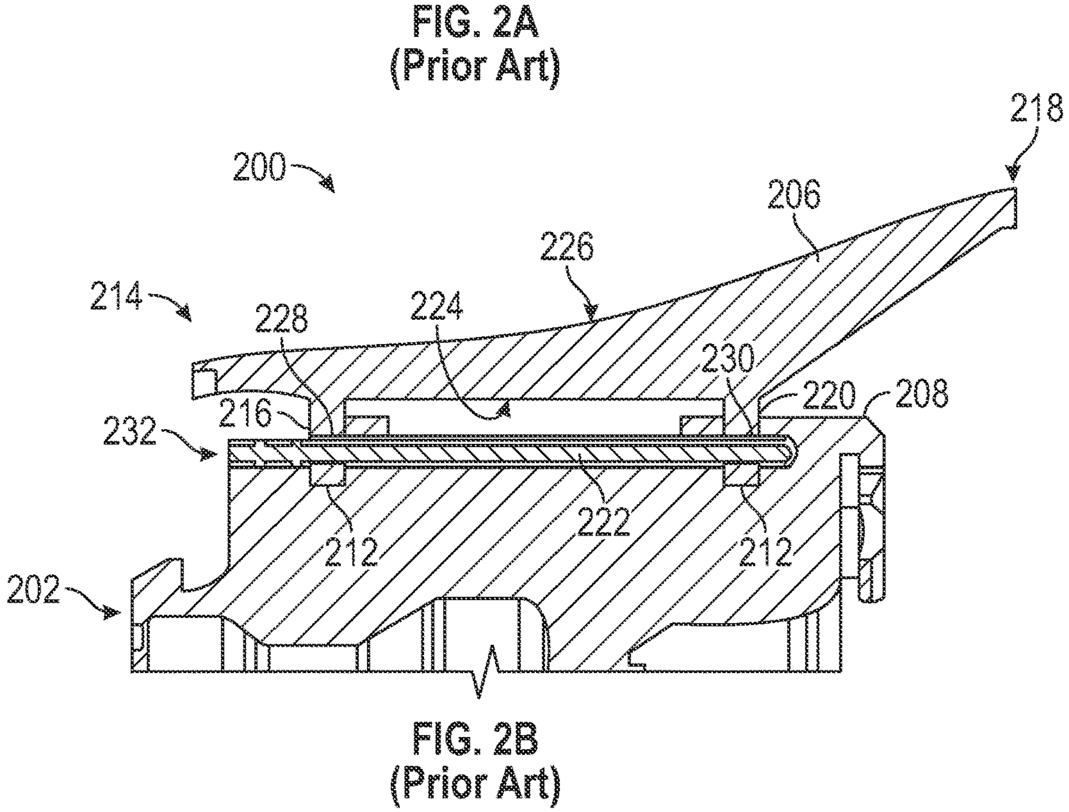
FIG. 2B (Prior Art)
FIG. 2B is a cross-sectional illustration of a portion of the fan assembly of FIG. 2A as viewed along the line 2B-2B.

Turning now to FIGS. 2A-2B, schematic illustrations of a conventional arrangement of a fan assembly 200 of a gas turbine engine are shown. FIG. 2A is an isometric illustration of the fan assembly 200 and FIG. 2B is a cross-sectional view of the fan assembly 200 as viewed along the line 2B-2B of FIG. 2A. The fan assembly 200, as shown, includes a rotor disk 202, a blade 204, and a platform 206. The blade 204 may be a fan blade (e.g., for fan section 22 shown in FIG. 1). Although shown with a single blade 204 and a single platform 206, those of skill in the art will appreciate that a number of blades and platforms are to be installed to the rotor disk 202. Further, although a specific configuration and arrangement of elements is shown, those of skill in the art will appreciate that alternative arrangements are possible without departing from the scope of the present disclosure. That is, the present illustrations and discussion are merely for illustrative and explanatory purposes and are not intended to be limiting.

The fan assembly 200 may be installed within a fan section of a gas turbine engine. As shown, the rotor disk 202 includes at least one attachment lug 208. The blade 204 is installed between two adjacent attachment lugs 208 within a blade cavity 210. During installation of the fan assembly 200, the platform 206 is coupled to or installed to the attachment lug 208 between adjacent blades 204. As shown, each attachment lug 208 includes one or more slots 212 that are configured to receive a portion of a respective platform 206. For example, as shown, a front end 214 of the platform 206 may include a first connector 216 that may engage within a respective slot 212, and at back end 218 of the platform 206, a second connector 220 may engage with a respective slot 212. A locking pin 222 may be used to provide removable attachment between the platform 206 and the attachment lug 208.

The first connector 216 and the second connector 220 extend from a non-gaspath surface 224 of the platform 206, as will be appreciated by those of skill in the art. Opposite the non-gaspath surface 224 of the platform 206 is a gaspath surface 226, which may be contoured as appreciated by those of skill in the art. Each of the connectors 216, 220 include securing elements 228, 230, respectively, defining apertures for attachment. To secure the platform 206 to a respective attachment lug 208, the first connector 216 is inserted into a respective slot 212 at the front end 214 and the second connector 220 is inserted into a respective slot 212 at the back end 218. The locking pin 222 is inserted through an attachment aperture 232 to pass through each of the securing elements 228, 230 of the platform 206 and thus through the first connector 216 and the second connector 220.

The fan blades 204 are configured to generate thrust with the blades 204 being mounted via a dovetail slot in the rotor disk 202 (or fan hub). Such a configuration requires both front and rear axial retention components to resist fan thrust and blade out loads, an under-root type spacer to reduce non-operating blade rocking during windmill, and a platform between adjacent fan blades to provide an aerodynamic flow path surface. The rotor disk 202 is designed to increase rotor stiffness to resist engine crosswind induced loads during operation. Platforms have typically been secured to the fan hub via integral tabs on the fan hub that are either for pins, or for hooks, as shown in FIGS. 2A-2B. Use of axial retention rings have been traditionally of a split retaining ring design or a bolted ring design. These systems require fastening features on the hub that add cost and weight to the engine.

Figure 3:
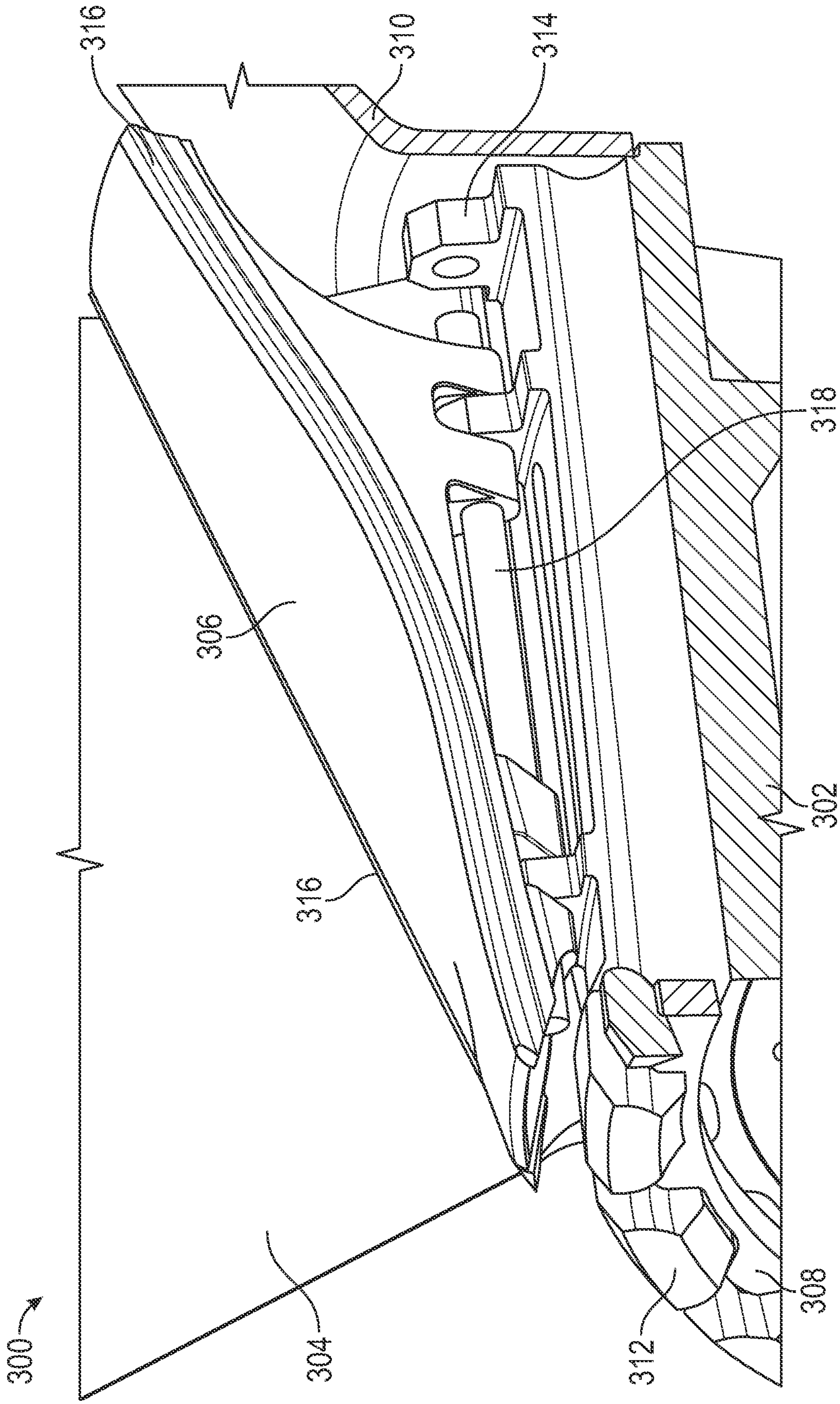
FIG. 3 (Prior Art)
FIG. 3 is a schematic illustration of a portion of a fan assembly.

For example, referring now to FIG. 3, a schematic illustration of a portion of another conventional fan assembly 300 is shown. The fan assembly 300 may be similar to the fan assembly 200 shown in FIGS. 2A-2B. The fan assembly 300 includes a rotor disk 302 (or fan hub) with a fan blade 304 and a platform 306 mounted thereto. Although shown with only a single fan blade 304 and single platform 306, those of skill in the art will appreciate that a plurality of fan blades and platforms will be installed to the rotor disk to form the completed fan assembly to be installed into a turbine engine.

The fan blade 304 may have a dove tail configuration to fit within a slot of the rotor disk 302. Once installed, axial movement of the fan blade 304 relative to the rotor disk 302 may be constrained by one or more retaining rings. For example, a forward retaining ring 308 and an aft retaining ring 310 may be attached to or otherwise fixedly engage with the rotor disk 302 to secure the fan blade 304 to the rotor disk 302 in the axial direction(s). In some configurations, the forward retaining ring 308 may be a split ring that engages with a forward side of the rotor disk 302 and may be retained thereto by one or more hooks 312 that are part of the rotor disk 302 on a forward edge or side thereof. The aft end of the fan blade 304 may be held in place or axially restrained by the aft retaining ring 310. The aft retaining ring 310 provides a securing mechanism for the aft end of the base of the fan blades 304 and also may include a surface to aid in flow stream control of air passing through the fan assembly 300 during use. The aft retaining ring 310 may be fixedly attached to the rotor disk 302 by one or more fasteners that secure the aft retaining ring 310 to a retention element 314 at the aft side/edge of the rotor disk 302. As such, the fan blade 304 may be held in place and restrained axially by the forward and aft retaining rings 308, 310.

As shown, the platform 306 may include edge seals 316 that may sealing engage with surfaces of the fan blades 304. The platform 306 may include an edge seal 316 along both axial extending sides of the platform 306, with each edge seal 316 sealing engaging with a different fan blade 304 (e.g., blades on opposite sides of the platform). The platform 306 is secured to the rotor disk 302 by a fastener 318, similar to the system described above with respect to FIGS. 2A-2B. The retaining rings 308, 310 increase part counts, weight, and costs.

As noted, the configurations of FIGS. 2A-2B and 3 are illustrative examples of conventional fan systems assemblies. In each of the configurations, the fan platforms are separate components from the fan blades and are thus attached to the fan rotor at lugs or similar structures. In the embodiment illustrated in FIGS. 2A-2B, the fan platforms are attached to the fan rotor by fasteners in a slotted configuration. In contrast, in the embodiment illustrated in FIG. 3, the fan platform is attached to the fan rotor at one or more tabs that extend radially outward from the lugs of the rotor. These fastener-type connections may include the use of retention rings and the like in combination with additional features/structures on the lugs of the rotor.

In accordance with embodiments of the present disclosure, the front and rear axial fan blade retention systems are configured to include features that retain the platform, thus eliminating the need for the conventional attachment and mounting mechanisms and systems shown and described above. In accordance with some embodiments of the present disclosure, a fan hub or rotor disk is provided with a rear axial retention cone that is bolted to a portion of the rotor disk and axially restricts the fan blade at the aft end. The retention cone may include a hook or similar retention element (e.g., full ring hook) that is configured to engage with a portion of a platform, thus providing retention of a platform at an aft end in addition to retention of the fan blade. During installation, and after the fan blades are installed to the rotor disk, with optional under-root spacers, a platform, in accordance with embodiments of the present disclosure, having a rear or aft tab is fit into the hook of the retention cone at the rear or aft end of the platform and then secured at a forward end thereof.

In accordance with some embodiments of the present disclosure, the front of the platform may include a front or forward tab. The forward tab may be lowered on to and in contact with the front of the rotor disk that contains a recessed slot, with the forward tab arranged to fit within the recessed slot. After positioning the forward tab in the recessed slot at the forward side or edge of the rotor disk, a front or forward retention ring is installed to securely retain both the blades and platforms to the rotor disk. The forward retention ring may be positioned to axially clear the exposed area of the front of the blade root, until it is nearly flush with a blade root. In accordance with some embodiments, the forward retention ring is then rotated until threaded holes in tabs on an outer diameter become aligned with slots on the front of the rotor disk (e.g., fan hub lugs). The forward retention ring, in accordance with some embodiments, may include a set of locking tabs that are configured to lock the tabs of the platform in place (e.g., radially constrain the tabs of the platforms). Bolts or other fasteners may then be used to secure the forward retention ring to the forward side of the rotor disk. The fastening may be employed when the forward retention ring and the rotor disk are formed of the same material. However, if different materials are used for the forward retention ring and the rotor disk, then, for example, tight clearance threaded dowel pins can be used that allow the lock ring freedom to expand or contract due to thermal conditions during use. The radial nature of the slots that receive the tabs of the platforms ensures that the forward retention ring remains centered during operation.

Figure 4A:
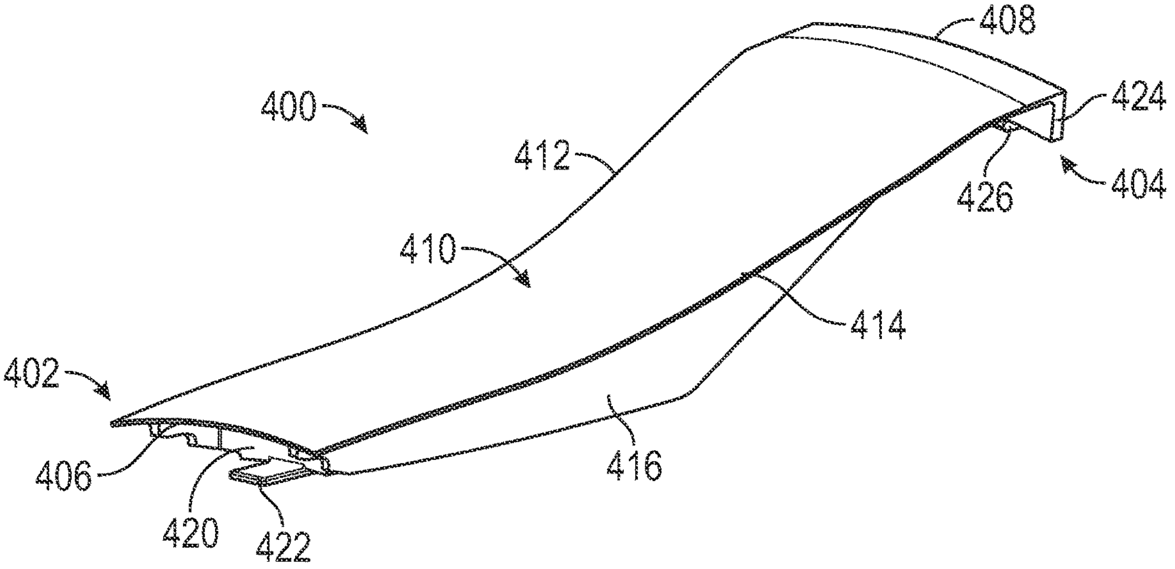
FIG. 4A is a schematic illustration of a fan platform in accordance with an embodiment of the present disclosure.
Figure 4B:
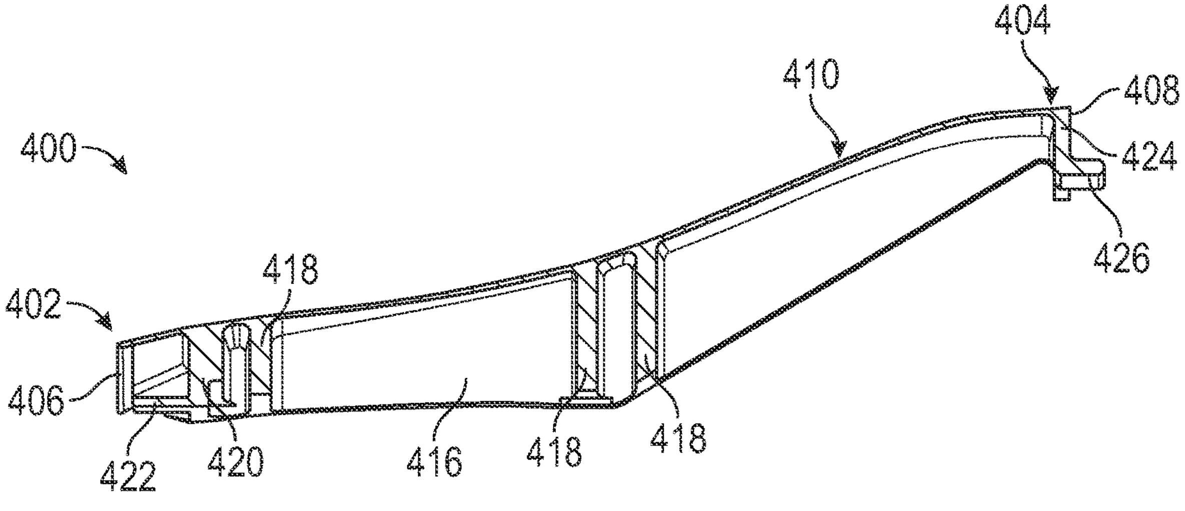
FIG. 4B is a side, cross-sectional view of the fan platform of FIG. 4A.

For example, referring now to FIGS. 4A-4B, schematic illustrations of a fan platform 400 in accordance with an embodiment of the present disclosure are shown. The fan platform 400 may be incorporated into a gas turbine engine or the like, for example, as shown and described above. The fan platform 400 has a forward end 402 and a rear end 404, with a leading edge 406 defined at the forward end 402 and an aft edge 408 at the rear end 404. The fan platform 400 is configured to be directly coupled to a rotor disk or hub of a fan rotor. In some configurations, a number of fan platforms 400 maybe arranged in an alternating pattern with fan blades, when assembled to form a fan of a gas turbine engine or other system.

The fan platform 400 includes a gaspath surface 410 that is contoured or shaped to aid in flow control and to reduce turbulence in an air flow through a fan section of the engine in which the fan platform 400 is installed. The gaspath surface 410 extends in an axial direction from the leading edge 406 to the aft edge 408. In a tangential or circumferential direction, the top of the fan platform 400 (i.e., the gaspath surface 410) extends from a first side 412 to a second side 414. The sides 412, 414 may be configured to receive a seal or similar structure that is attached to the side edges of the gaspath surface 410 along the sides 412, 414 and are configured to sealing engage with surfaces of an adjacent fan blade. The sides 412, 414 will extend in an axial direction (e.g., relative to an axis through a center of a rotor disk and/or engine structure) when installed in a fan assembly and/or engine.

The fan platform 400 includes one or more first support ribs 416 and one or more second support ribs 418. The first support ribs 416 extend downward from the underside of the gaspath surface 410 in a radial direction and define a wall or surface that extends from a location at or near the leading edge 406 to the aft edge 408 (i.e., extend in an axial direction). The second support ribs 418 may also extend radially downward from an underside of the gaspath surface 410 and may span between two first support ribs 416 (i.e., in a circumferential direction). The ribs 416, 418 provide for increased strength and rigidity to the fan platform 400 while providing less weight and/or material than the fastener structures of the prior fan platform configurations.

At the forward end 402, the fan platform 400 includes a forward support rib 420 that is similar in structure to the second support ribs 418 (i.e., extending in a circumferential direction and between first support ribs 416). The forward support rib 420 includes a forward tab 422 that is configured to engage with a portion of a rotor disk of a fan assembly. At the aft end 404 of the fan platform 400, an aft support rib 424 includes an aft tab 426. The aft tab 426 is configured to engage with a retention cone that is attached at an aft side of a rotor disk, as shown and described herein.

Figure 5:
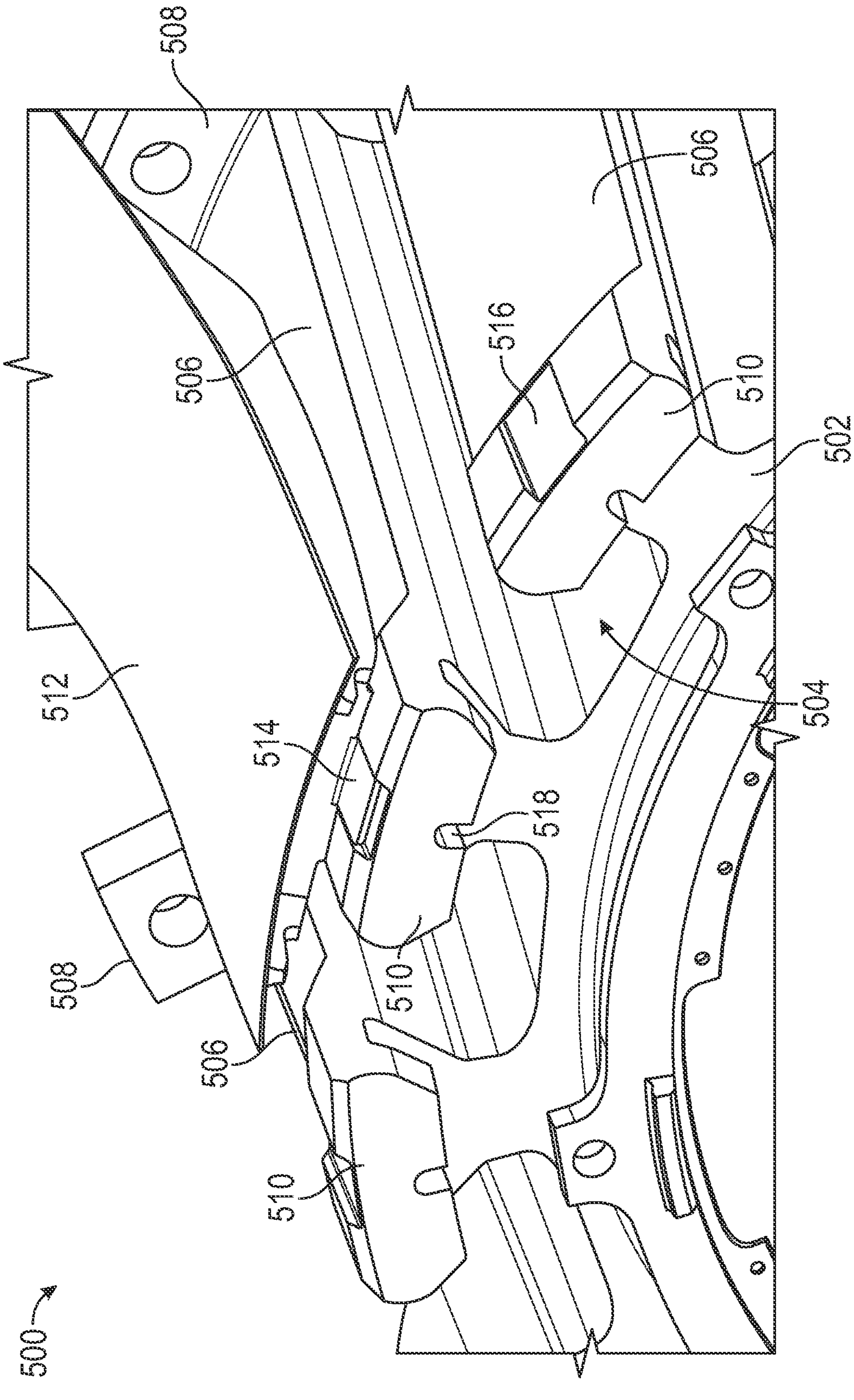
FIG. 5 is a schematic illustration of a portion of a fan assembly in accordance with an embodiment of the present disclosure.

Referring now to FIG. 5, a schematic illustration of a portion of a fan assembly 500 in accordance with an embodiment of the present disclosure is shown. The fan assembly 500 may be similar to the fan assemblies described above and configured to receive a plurality of fan blades and fan platforms for assembly to form a fan section of a turbine engine. The fan assembly 500 includes a rotor disk 502 (or fan hub) with slots 504 for receiving fan blades (not shown) and a platform lug 506 for receiving fan platforms. The rotor disk 502 is configured with an alternating pattern of slots 504 and lugs 506 such that, when assembled, an alternating pattern of fan blades and fan platforms is arranged about an exterior rim or edge of the rotor disk 502.

The slots 504 may be dovetail shaped and configured to receive a root or base of a fan blade that can slide into the slots 504. After sliding the fan blade into place, the axial movement of the fan blade must be restrained. Accordingly, at the aft end, a retention cone may be installed. In some embodiments, the retention cone may be fixedly attached to the rotor disk 502 by one or more fasteners that attach to a lug flange 508 that is at an aft end of the lugs 506. At the forward end, the lugs 506 include a mounting structure 510 that extends from the forward end of the lugs 506 and is configured to receive one or more other components, as described herein.

As shown in FIG. 5, a fan platform 512 is shown partially mounted to one of the lugs 506. At an aft end, the fan platform 512 may fixedly connect to a retention cone (not shown) that is, in turn, fixedly attached to the rotor disk 502 at the lug flanges 508. That is, in accordance with some embodiments of the present disclosure, the fan platform 512 does not directly attach to the rotor disk at the aft end. At the forward end of the fan platform 512, a forward tab 514 of the fan platform 512 is configured to engage with the mounting structure 510 of the lug 506. As shown, the forward tab 514 of the fan platform 512 may be positioned in a lug recess 516 that is configured to receive the forward tab 514 and prevent tangential or circumferential movement of the forward tab 514 relative to the mounting structure 510. Once installed, as shown in FIG. 5, a forward retention ring (not shown) may be installed to secure both installed fan blades and the installed fan platforms, with the forward retention ring configured to axially secure the fan blades and radially and axially restrain the forward end of the fan platform 512. The forward retention ring may be fixedly attached or connected to the lugs 506 of the rotor disk 502 by one or more fasteners installed through respective fastener apertures 518.

Figure 6A:
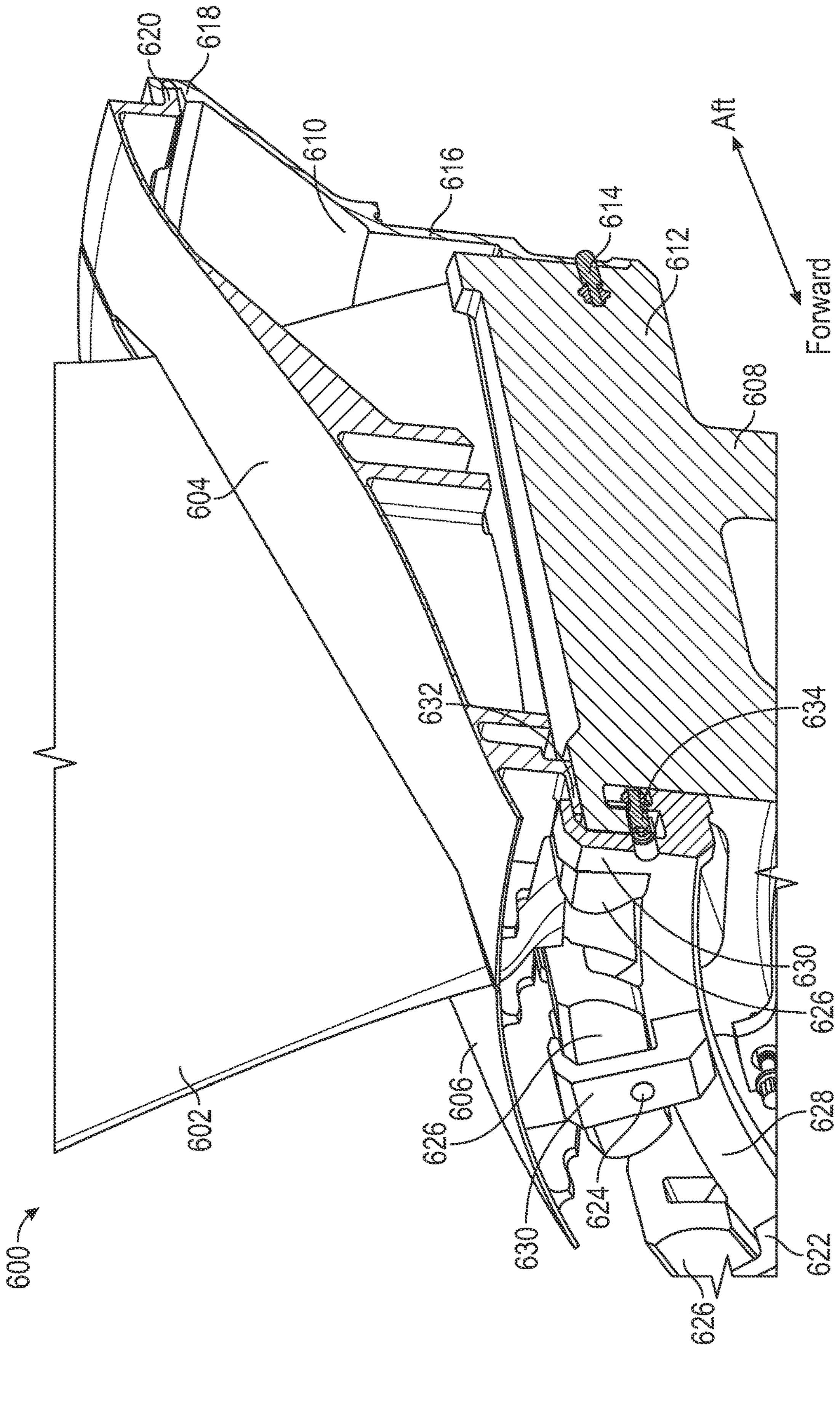
FIG. 6A is a schematic illustration of a portion of a fan assembly in accordance with an embodiment of the present disclosure.
Figure 6B:
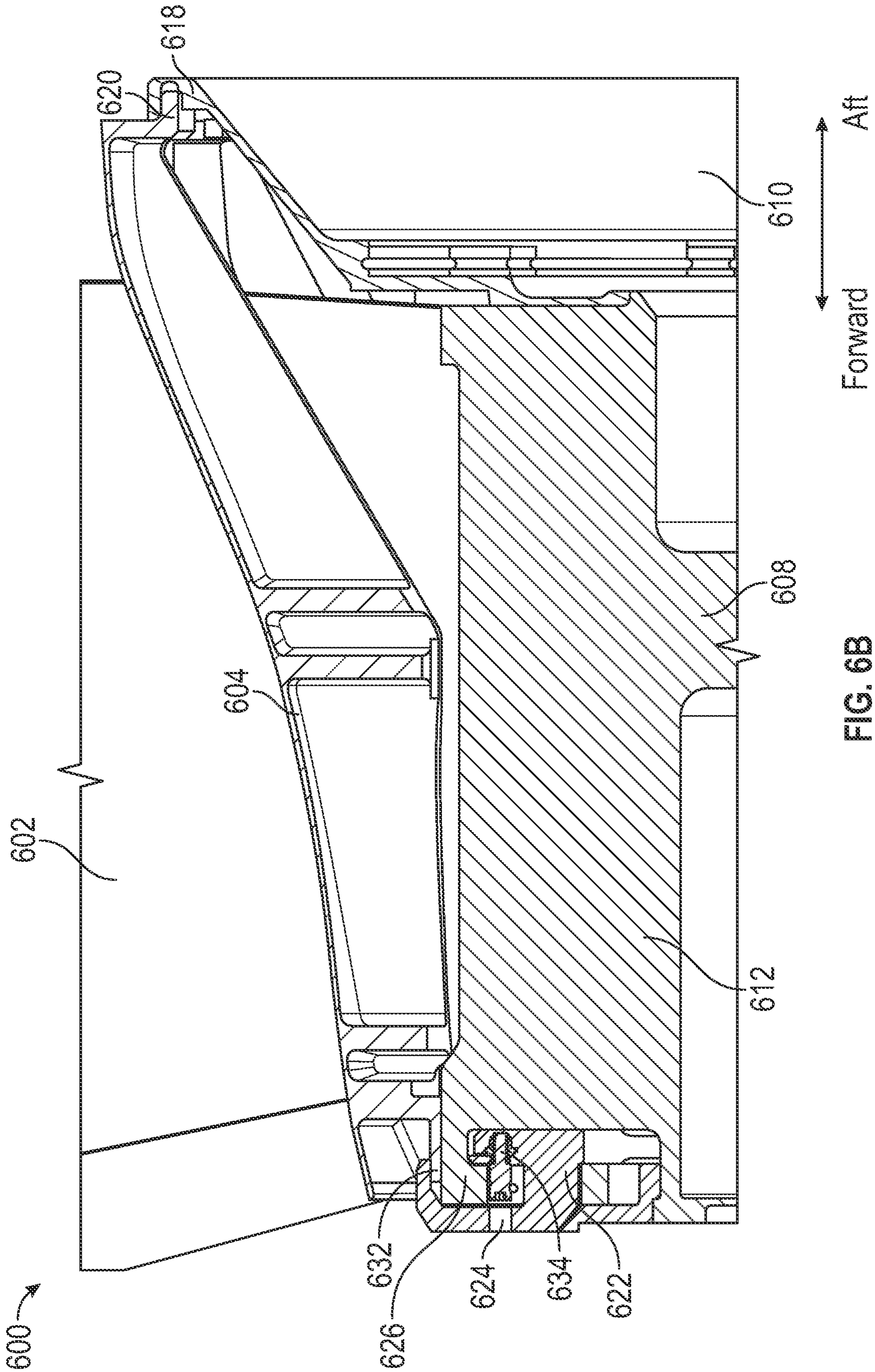
FIG. 6B is a side view, partial cross-sectional illustration of the fan assembly of FIG. 6A.
Figure 6C:
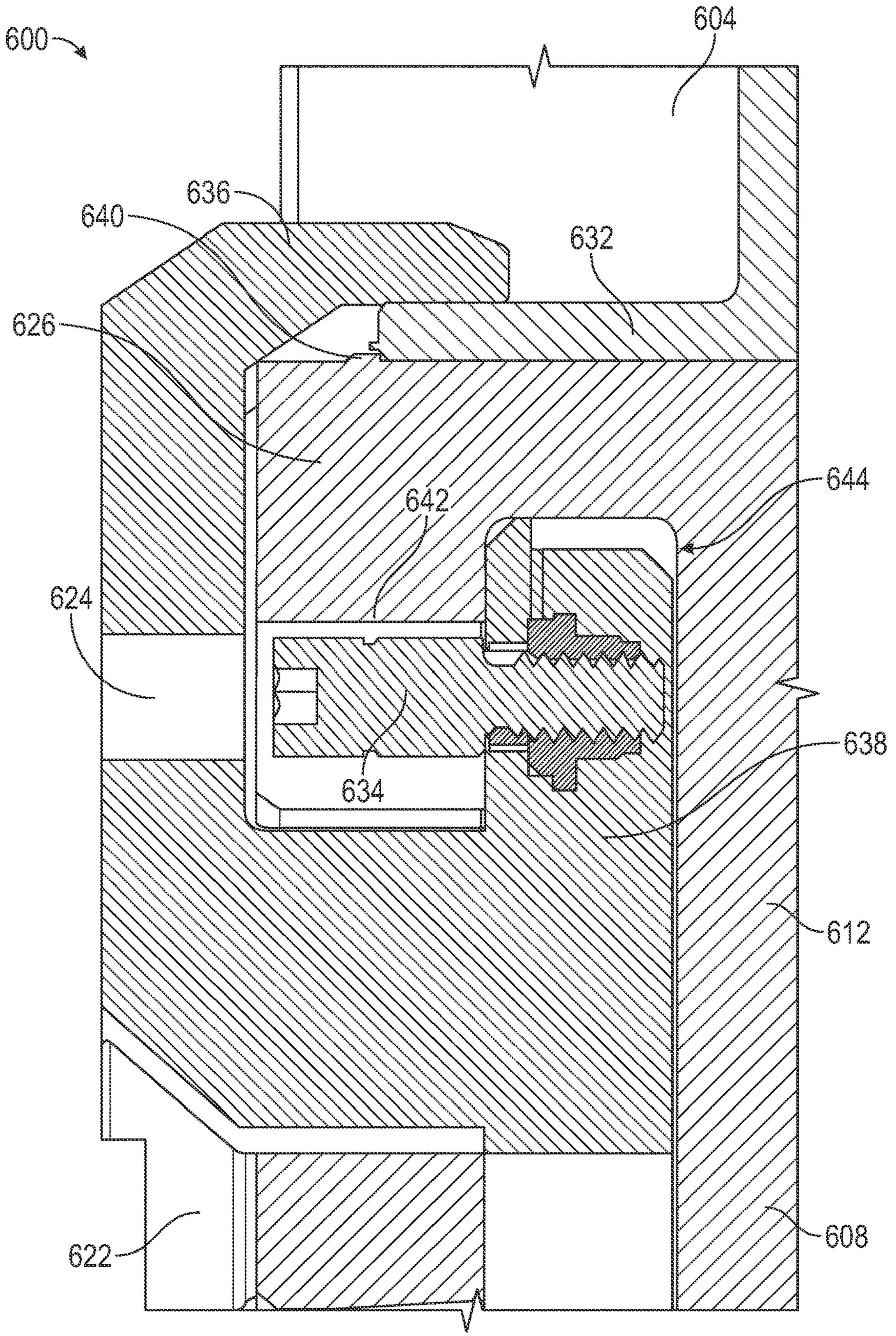
FIG. 6C is an enlarged illustration of a portion of the fan assembly of FIG. 6A.

Referring now to FIGS. 6A-6C, schematic illustrations of a portion of a fan assembly 600 in accordance with an embodiment of the present disclosure are shown. The fan assembly 600 may be similar to that shown and described above and may be configured to for installation within a turbine engine or the like. As shown, the fan assembly 600 includes a fan blade 602, a first fan platform 604, and a second fan platform 606 installed to a rotor disk 608 of the fan assembly 600. The first fan platform 604 is arranged on a first side of the fan blade 602 and the second fan platform 606 is arranged on a second side of the fan blade 602.

At the aft end of the rotor disk 608, an aft retention ring 610 is installed to, at least partially, secure both the fan blade 602 and the fan platforms 604, 606 (and any other fan blades/fan platforms) at the aft end thereof. The aft retention ring 610 may be fixedly attached to the rotor disk 608, such as at a lug 612 of the rotor disk 608. One or more fasteners 614 may fixedly connect to the lug 612 (e.g., directly into the lug through an aperture and/or to a flange, as shown in FIG. 5). The aft retention ring 610 includes a radial portion 616 that is formed as a wall or similar sheet-type structure that defines a ring of material to secure an aft end of a root of the fan blade and thus prevent aftward movement of the fan blade 602. The aft retention ring 610 includes a platform retention hook 618 at an aft end of the aft retention ring 610. The platform retention hook 618 is configured to receive an aft tab 620 of the fan platform 604. As such, the aft end of the fan platform 604 may be both axially and radially constrained by the platform retention hook 618. In some embodiments, and as shown, the aft retention ring 610 may have a substantially cone shape that has the radial portion 616 at a forward end of the aft retention ring 610 that then extends at an angle to the platform retention hook 618, thus defining a substantially conical shape. In some embodiments, the aft retention ring 610 may be a full hoop structure or single bodied. In other embodiments, the aft retention ring 610 may be separated into multiple arclengths to form a full hoop structure when attached to the rotor disk 608.

At the forward end, both the fan blade 602 and the fan platform 604 may be secured and held in place by a forward retention ring 622. The forward retention ring 622 may be installed to the forward side of the rotor disk 608. During installation, the forward retention ring 622 may be placed in a first orientation relative to the lugs 612 and then rotated into a second orientation where fastener apertures 624 of the forward retention ring 622 may align with fastener apertures of the lugs 612 (e.g., fastener apertures 518 shown in FIG. 5). The fastener apertures of the lugs 612 may be formed on or in mounting structures 626 of the lugs 612, similar to that described above. The forward retention ring 622 includes a blade retention portion 628 and a platform retention portion 630. The blade retention portion 628, in this embodiment, is a structure in the form of a substantially flat ring that, when positioned for in-use operation, will abut a forward end of a root of the fan blade 602 to prevent axial (forward) movement of the fan blade 602 relative to the rotor disk 608. The platform retention portion 630 may be configured as a number of hooks that can be moved into position over the mounting structures 626 of the lugs 612 and forward tabs 632 of the fan platforms 604. On or more fasteners 634 may pass through the fastener apertures 624 which are formed in the platform retention portion 630, through fastener apertures in the mounting structures 626 of the lugs 612, and then secure again to another portion of the platform retention portion 630. The platform retention portion 630 will thus position and retain the forward tab 632 of the fan platform 604 in place, while also retaining the fan blade 602 in place.

FIG. 6C illustrates an enlarged view of the forward end connection between the fan platform 604 and the rotor disk 608, particularly at the mounting structure 626 of a lug 612 of the rotor disk 608. As shown, a cross-sectional view of a portion of the forward retention ring 622 is shown as installed and connected to the lug 612 and retaining the forward tab 632 of the fan platform 640. The forward retention ring 622 includes a tab hook 636 and a lug hook 638. The tab hook 636 is configured to fit over an exterior portion of the mounting structure 626 and the forward tab 632 of the fan platform 604. The forward tab 632 is positioned within a lug recess (e.g., lug recess 516 shown in FIG. 5) of the mounting structure 626. The mounting structure 626 may include a stop 640 that is a protrusion and/or lip of the lug recess and is configured to aid in positioning and retaining the fan platform 604 to the lug 608. The tab hook 636 is configured to be positioned over a forward tab 632 of the fan platform 604 by rotation of the forward retention ring 622 during installation. When the fastener apertures 624 of the forward retention ring 622 are aligned with fastener apertures 642 of the mounting structures 626, a fastener 634 may be installed through a portion of the tab hook 636 (e.g., forward section/portion) and inserted into the fastener apertures 642 of the mounting structures 626 and then engage with the lug hook 638 of the forward retention ring 622, as shown in FIG. 6C.

As shown in FIG. 6C, the mounting structure 626 of the lug 612 has a hook-like configuration that extends axially forward from the front end of the lug 612 and then projects radially downward (inward) to define a mounting slot 644. The mounting slot 644 is sized and shaped to receive the lug hook 638 of the forward retention ring 622. In cross-sectional profile, the forward retention ring 622 has a general G-shape or C-shape, that can fit over the mounting structure 626 to engage and secure the forward tab 632 of the fan platform 604 and also to engage with and secure the forward retention ring 622 to the lug 612 of the rotor disk 608.

Figure 7:
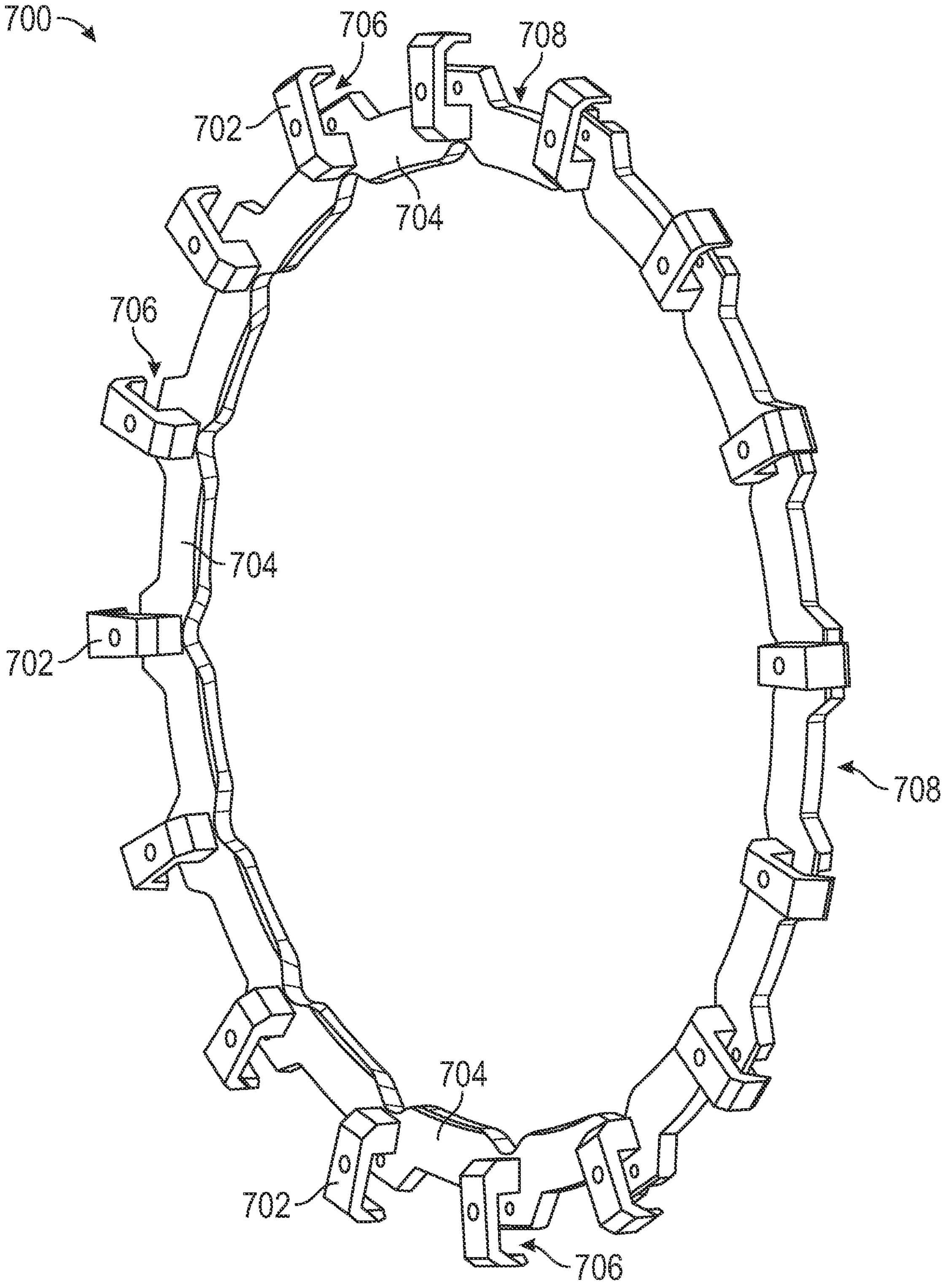
FIG. 7 is a schematic illustration of a forward retention ring in accordance with an embodiment of the present disclosure for use with a fan assembly.

Referring now to FIG. 7, a schematic illustration of a forward retention ring 700 in accordance with an embodiment of the present disclosure is shown. The forward retention ring 700 may be used, for example, with a rotor disk, fan blades, and fan platforms, such as shown and described above. The forward retention ring 700 is configured to fixedly attach to a fan rotor disk and secure both fan blades and fan platforms to the fan rotor disk on the forward or leading edge side of the rotor disk.

The forward retention ring 700 includes a number of tab hooks 702 and blade retention portions 704 that are arranged in an alternating pattern about the forward retention ring 700. Each of the tab hooks 702 is configured in an arcuate shape to define a space 706 for receiving a mounting structure of a lug of the rotor disk, as shown and described above (e.g., as shown in FIG. 6C). Alternating with the tab hooks 702 are the blade retention portions 704. The blade retention portions 704 are flat spans of material between adjacent tab hooks 702. As shown, the blade retention portions 704 include or define a lug recess 708. The lug recess 708 is configured to permit installation of the forward retention ring 700 to the rotor disk by providing a space to allow the mounting structures of the lugs to extend over a portion of the forward retention ring 700. The forward retention ring 700 is then rotated relative to the rotor disk to orient the forward retention ring 700 in a connection or attachment orientation. In the attachment orientation, the tab hooks 702 are moved into position to align with the lugs, with the mounting structure of the lug arranged within the tab hooks 702 (e.g., as shown in FIGS. 6A-6C).

Figure 8A:
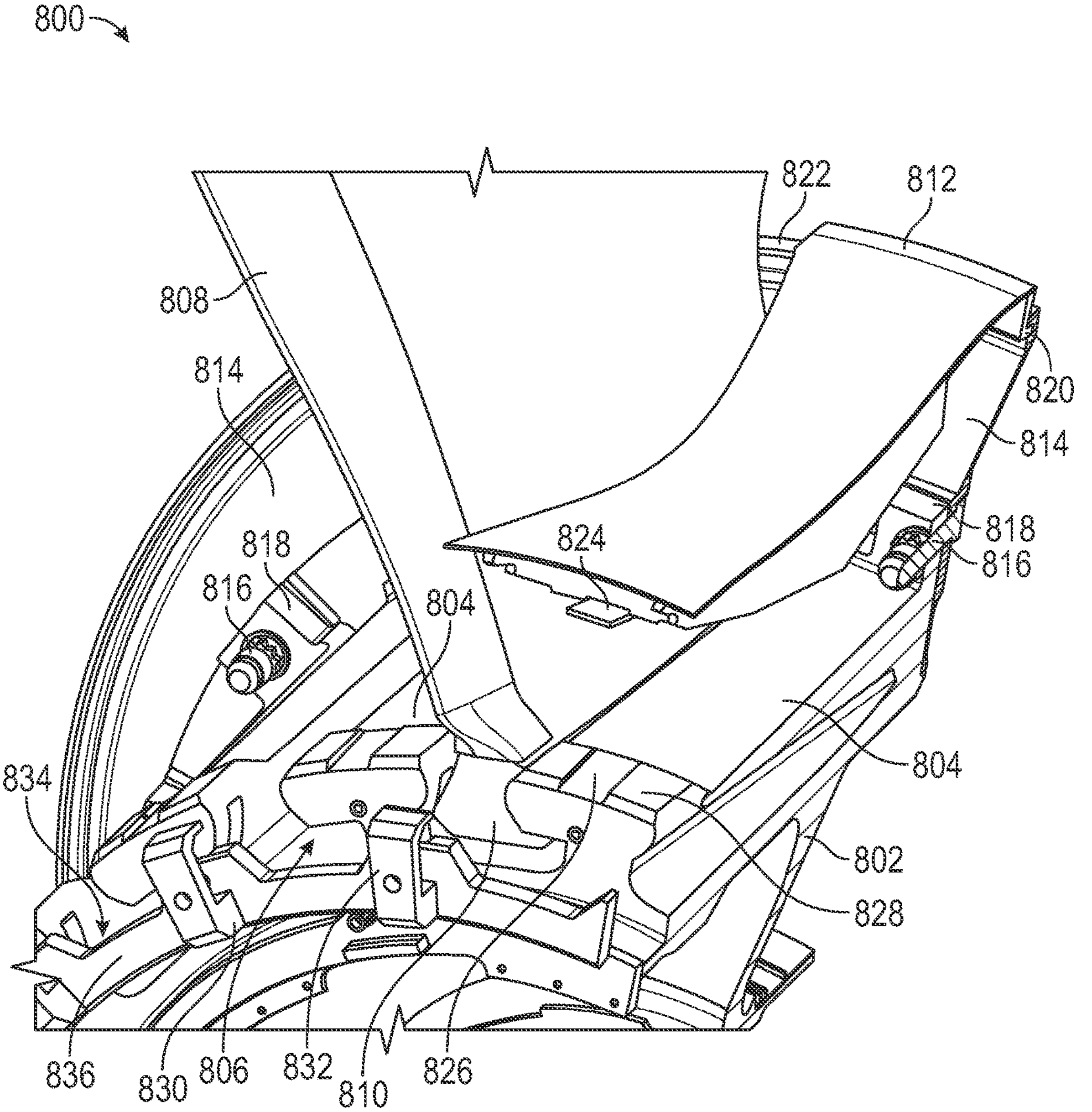
FIG. 8A is a schematic illustration of a portion of an assembly process of assembling a fan assembly in accordance with an embodiment of the present disclosure.
Figure 8B:
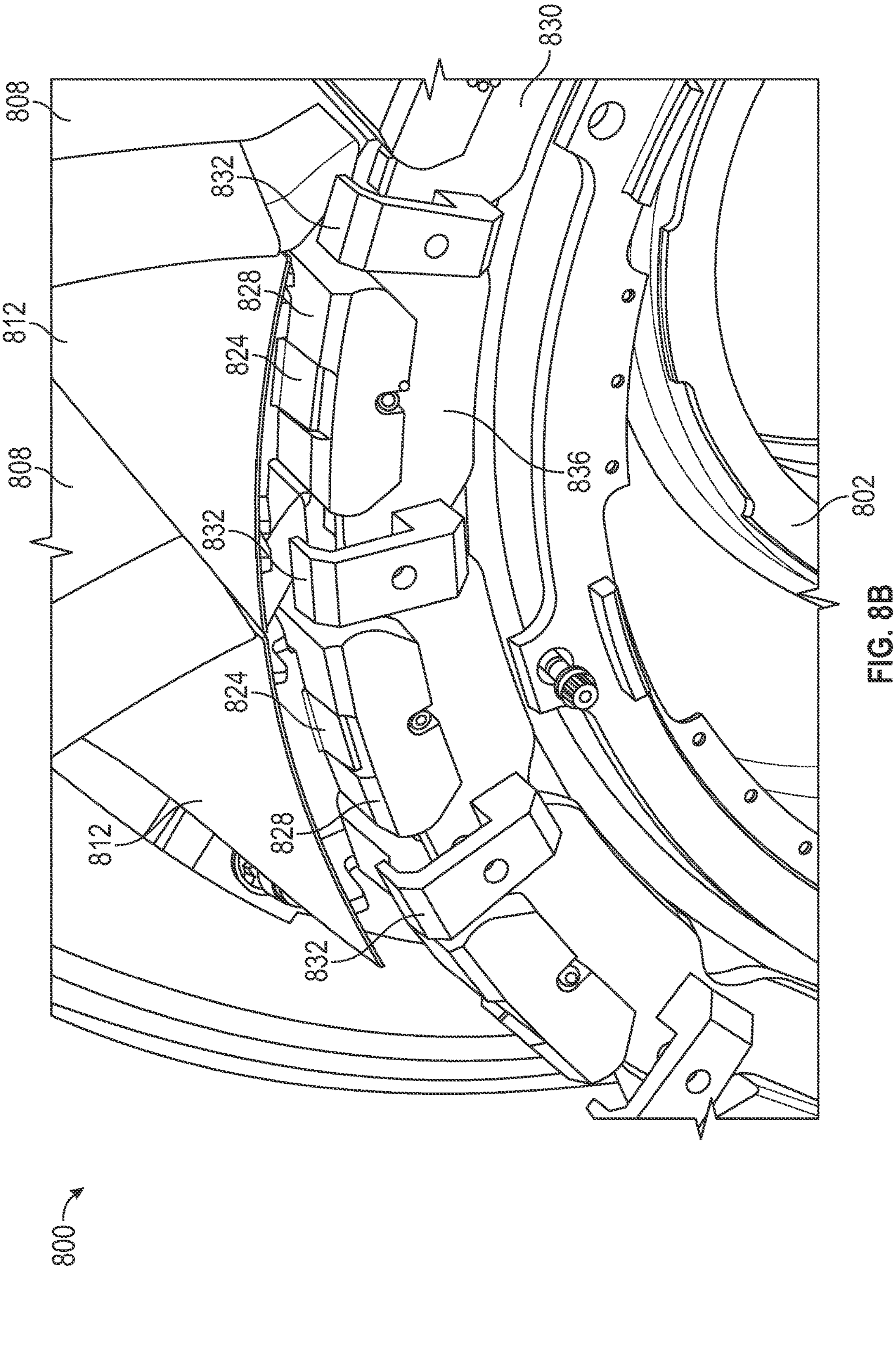
FIG. 8B is a schematic illustration of a portion of the assembly process shown in FIG. 8A, with a forward retention ring shown in a first position.
Figure 8C:
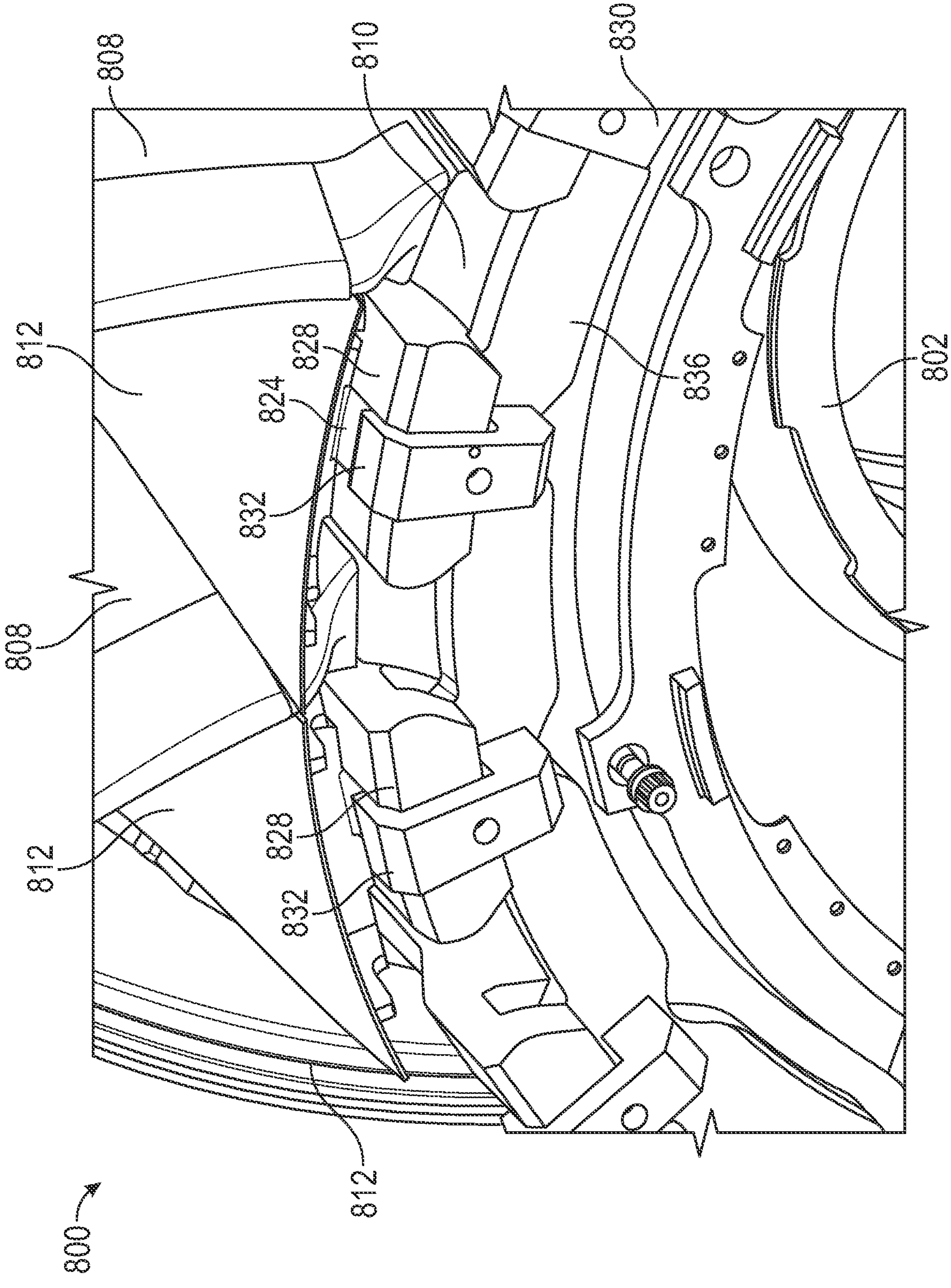
FIG. 8C is a schematic illustration of a portion of the assembly process shown in FIG. 8A, with a forward retention ring shown in a second position.

Referring now to FIGS. 8A-8C, schematic illustrations of an assembly process of a fan assembly 800 in accordance with an embodiment of the present disclosure are shown. The fan assembly 800 is similar to that shown and described above, having a rotor disk 802 having a number of lugs 804 about an outer diameter or circumference of the rotor disk 802. The lugs 804 define slots 806 between adjacent lugs 804, with the slots 806 shaped and sized to receive a portion of a fan blade 808. For example, as shown in FIG. 8A, a root 810 of the fan blade 808 is installed in one of the slots 806 between two lugs 804. The slots 806 may be dovetailed in geometry, as shown, or may have other geometries, shapes, and/or mechanisms for receiving and retaining a fan blade to the rotor disk 802.

As shown in FIG. 8A, a single fan blade 808 and a single fan platform 812 are shown. FIG. 8A illustrates a step of the installation and assembly process for the fan assembly 800. It will be appreciated that each slot 806 is configured to receive a respective fan blade 808 and each lug 804 is configured to receive a respective fan platform 812, and the configuration shown in FIGS. 8A-8C is not intended to be limiting, but rather provides an illustrative example of an installation process in accordance with an embodiment of the present disclosure.

During installation and assembly, an aft retention ring 814 is fixed attached to an aft or rear side of the rotor disk 802. As shown, the aft retention ring 814 may be affixed to the rotor disk 802. In this illustrative example, fasteners 816 are used to fixedly connect the aft retention ring 814 to the rotor disk 802 at lug flanges 818 that are provided at the aft side or end of the lugs 804. It will be appreciated that the aft retention ring 814 may attach to the rotor disk 802 at other locations and/or by other means, without departing from the scope of the present disclosure. The aft retention ring 814 provides an aft surface or wall structure to prevent aftward movement of the fan blade 808 during use. The aft retention ring 814 also provides an aft connection and attachment for the fan platform 812. For example, as shown, an aft tab 820 of the fan platform 812 may be received by a platform retention hook 822 of the aft retention ring 814. As shown in FIG. 8A, when the aft tab 820 is inserted into the platform retention hook 822, the fan platform 812 may be able to pivot about the engagement point between the aft tab 820 and the platform retention hook 822. When the aft end of the fan platform 812 is inserted into the platform retention hook 822, a forward or leading edge/end of the fan platform 812 may be pivoted to contact the lug 804.

The fan platform 812 includes a forward tab 824 that is configured to be seated in a lug recess 826 of a mounting structure 828 of the lug 804. FIG. 8B illustrates a forward tab 824 of two fan platforms 812 as seated within respective lug recesses 826 of respective mounting structures 828. As shown in FIGS. 8A-8B, a forward retention ring 830 is arranged to be installed to the rotor disk 802 (referred to as a first position). The forward retention ring 830 includes a plurality of tab hooks 832 that alternate with lug recesses 834 about the circumference of the forward retention ring 830, as described above. The lug recesses 834 are configured to allow the mounting structures 828 of the lugs 804 to fit through the lug recesses 834 and position the forward retention ring 830 in the first position.

A second position of the forward retention ring 830 is shown in FIG. 8C. As shown, the forward retention ring 830 is rotated relative to the rotor disk 802 such that the tab hooks 832 are rotated to align with the forward tabs 824 of the fan platforms 812 (e.g., aperture on tab hooks 832 align with the fastener apertures 642 shown in FIGS. 6B-6C). In the second position, the tab hooks 832 may be fixed connected to the mounting structures 828 of the lugs 804 and capture the forward tabs 824 of the fan platforms 812 in the lug recesses 826. As fastener may be used to fixedly connect the forward retention ring 830 to the rotor disk 802. In the second position (FIG. 8C), blade retention portions 836 of the forward retention ring 830 are rotated from being aligned with the mounting structures 828 (as shown in FIG. 8B) to align with the slots 806 and the roots 810 of the fan blades 808. As such, the blade retention portions 836 are positioned to prevent forward axial movement of the fan blades 808. The tab hooks 832 will secure the forward tabs 824 of the fan platforms 812 and prevent radial and axial movement thereof (in combination with the aft retention ring 814). In some configuration, the tab hooks 832 may secure the forward tabs 824 with a close tolerance, radially loose fit.

Embodiments of the present disclosure are directed to a fan hub or rotor disk where a rear axial retention cone (e.g., aft retention ring) can be bolted. The aft retention ring may include a full ring hook (e.g., platform retention hook) for receiving an aft tab of a fan platform. After the fan blades are installed within slots between lugs of the rotor disk, platforms having the above illustrated and described aft tab then fits into the platform retention hook of the aft retention ring. The front of the platform includes a forward tab that may be lowered onto mounting structures of the lugs of the rotor disk. The forward tab may be received in a lug recess. A forward retention ring is then positioned to secure both the blades and platforms to the rotor disk.

The forward retention ring and mounting structures of the lugs of the rotor disk may be arranged or configured as a slot-and-bayonet style design. Based on this, the forward retention ring may have, at least, a first position and a second position during installation, relative to the orientation of these features. In the first position, the forward retention ring and features thereof are arranged to axially clear an exposed area of the front of a blade root, until it is nearly flush with the blade root. The forward retention ring is then rotated until threaded holes in tabs on an outer diameter of the forward retention ring become aligned with slots that exist on the front of the mounting structures of the lugs. The forward retention ring has a set of tab hooks that also lock the outer diameter of the forward tabs of the platforms. Bolts or other fasteners are then used to secure the forward retention ring to the forward side or front of the lugs of the rotor disk. Use of fasteners may be employed when the forward retention ring is made from the same material as the rotor disk. However, if the forward retention ring and the rotor disk are formed from different materials, then tight clearance threaded dowel pins can be used that allow the forward retention ring freedom to expand or contract due to thermal impacts during use. The radial nature of the slots keeps the forward retention ring centered at any operating condition.

Advantageously, embodiments of the present disclosure are directed to a system for capturing all fan blade components (e.g., blades, platforms) while simplifying the outer diameter machining of the rotor disk and reducing weight. As such, assembly may be improved and vibration may be reduced during use. For example, in conventional systems, the forward retention ring is typically a split-ring held in place by hooks of the rotor disk. As a result, the forward retention ring (split-ring) may become loose during operation and contribute to fan blade vibrations. However, embodiments of the present disclosure may minimize or eliminate such vibrations through the mounting and attaching of the forward retention direct to the rotor disk by fasteners. Accordingly, improved fan assemblies are provided by embodiments of the present disclosure, providing advantages in assembly, cost, component number, weight, and the like, as described herein and as will be apparent to those of skill in the art.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A fan assembly for a gas turbine engine, the fan assembly comprising:

a rotor disk having a plurality of lugs about an outer diameter of the rotor disk, wherein a plurality of slots are defined between adjacent lugs about the outer diameter of the rotor disk;

a fan platform configured to be mounted to a lug of the plurality of lugs, the fan platform having a forward tab and an aft tab;

an aft retention ring configured to be fixedly attached to an aft side of the rotor disk, the aft retention ring having a platform retention hook for receiving the aft tab of the fan platform; and a forward retention ring configured to be fixedly attached to a forward side of the rotor disk, the forward retention ring having a tab hook configured to attach the forward retention ring to the lug of the plurality of lugs and retain the forward tab of the fan platform to the lug of the plurality of lugs, wherein each lug of the plurality of lugs comprises a mounting structure on a forward side thereof, wherein each mounting structure is configured to receive a portion of the forward retention ring and a fastener to affix the forward retention ring to the respective lug, and wherein each mounting structure and the forward retention ring have a bayonet-and-slot arrangement, wherein the forward retention ring is configured to rotate from a first position to a second position relative to the rotor disk, wherein in the second position each fastener may pass through the forward retention ring and a respective mounting structure to secure the forward retention ring to the rotor disk.

2. The fan assembly of claim 1, wherein the fan platform is one of a plurality of fan platforms, wherein each mounting structure comprises a tab recess configured to receive a respective forward tab of a respective fan platform of the plurality of fan platforms.

3. The fan assembly of claim 1, wherein the fan platform has a gaspath surface and comprises at least one first support rib extending between a forward end and an aft end of the fan platform, wherein the first support rib is arranged opposite the gaspath surface.

4. The fan assembly of claim 3, wherein the fan platform comprises at least one second support rib extending transverse from the at least one first support rib.

5. The fan assembly of claim 1, further comprising a fan blade installed within one of the slots of the plurality of slots.

6. The fan assembly of claim 5, wherein the fan blade is retained in an axial direction at an aft end by the aft retention ring and at a forward end by the forward retention ring.

7. The fan assembly of claim 1, wherein the aft retention ring is attached to the rotor disk at one or more lug flanges at aft ends of one or more of the plurality of lugs.

8. The fan assembly of claim 1, wherein the aft retention ring has a conical shaped portion extending from a portion that attaches to the rotor disk to the platform retention hook.

9. The fan assembly of claim 1, wherein the forward retention ring and the rotor disk are formed from the same material.

10. The fan assembly of claim 1, wherein the tab hook of the forward retention ring is one of a plurality of tab hooks and the forward retention ring further comprises a plurality of blade retention portions that are arranged in an alternating pattern with the plurality of tab hooks.

11. A gas turbine engine comprising:

a fan assembly, a compressor section, a combustor section, and a turbine section arranged to define a core flow path through the gas turbine engine, wherein the fan assembly comprises:

a rotor disk having a plurality of lugs about an outer diameter of the rotor disk, wherein a plurality of slots are defined between adjacent lugs about the outer diameter of the rotor disk;

a fan platform configured to be mounted to a lug of the plurality of lugs, the fan platform having a forward tab and an aft tab;

an aft retention ring configured to be fixedly attached to an aft side of the rotor disk, the aft retention ring having a platform retention hook for receiving the aft tab of the fan platform; and a forward retention ring configured to be fixedly attached to a forward side of the rotor disk, the forward retention ring having a tab hook configured to attach the forward retention ring to the lug of the plurality of lugs and retain the forward tab of the fan platform to the lug of the plurality of lugs, wherein each lug of the plurality of lugs comprises a mounting structure on a forward side thereof, wherein each mounting structure is configured to receive a portion of the forward retention ring and a fastener to affix the forward retention ring to the respective lug, and wherein each mounting structure and the forward retention ring have a bayonet-and-slot arrangement, wherein the forward retention ring is configured to rotate from a first position to a second position relative to the rotor disk, wherein in the second position each fastener may pass through the forward retention ring and a respective mounting structure to secure the forward retention ring to the rotor disk.

12. The gas turbine engine of claim 11, wherein the fan platform has a gaspath surface and comprises at least one first support rib extending between a forward end and an aft end of the fan platform, wherein the first support rib is arranged opposite the gaspath surface.

13. The gas turbine engine of claim 11, further comprising a fan blade installed within one of the slots of the plurality of slots.

14. The gas turbine engine of claim 11, wherein the aft retention ring is attached to the rotor disk at one or more lug flanges at aft ends of one or more of the plurality of lugs.

15. The gas turbine engine of claim 11, wherein the aft retention ring has a conical shaped portion extending from a portion that attaches to the rotor disk to the platform retention hook.

16. The gas turbine engine of claim 11, wherein the forward retention ring and the rotor disk are formed from the same material.

17. The gas turbine engine of claim 11, wherein the tab hook of the forward retention ring is one of a plurality of tab hooks and the forward retention ring further comprises a plurality of blade retention portions that are arranged in an alternating pattern with the plurality of tab hooks.

18. A fan assembly for a gas turbine engine, the fan assembly comprising:

a rotor disk having a plurality of lugs about an outer diameter of the rotor disk, wherein a plurality of slots are defined between adjacent lugs about the outer diameter of the rotor disk;

a fan platform configured to be mounted to a lug of the plurality of lugs, the fan platform having a forward tab and an aft tab;

an aft retention ring configured to be fixedly attached to an aft side of the rotor disk, the aft retention ring having a platform retention hook for receiving the aft tab of the fan platform; and a forward retention ring configured to be fixedly attached to a forward side of the rotor disk, the forward retention ring having a tab hook configured to attach the forward retention ring to the lug of the plurality of lugs and retain the forward tab of the fan platform to the lug of the plurality of lugs;

a fan blade installed within one of the slots of the plurality of slots, wherein the fan blade is retained in an axial direction at an aft end by the aft retention ring and at a forward end by the forward retention ring.

19. The fan assembly of claim 18, wherein the fan platform is one of a plurality of fan platforms, wherein each mounting structure comprises a tab recess configured to receive a respective forward tab of a respective fan platform of the plurality of fan platforms.

20. The fan assembly of claim 18, wherein the tab hook of the forward retention ring is one of a plurality of tab hooks and the forward retention ring further comprises a plurality of blade retention portions that are arranged in an alternating pattern with the plurality of tab hooks.

* * * * *